Feb. 12, 1935.    H. A. FOOTHORAP    1,990,480
TABULATING MECHANISM FOR TYPEWRITING MACHINES
Filed July 24, 1930    6 Sheets-Sheet 1

Feb. 12, 1935.   H. A. FOOTHORAP   1,990,480
TABULATING MECHANISM FOR TYPEWRITING MACHINES
Filed July 24, 1930   6 Sheets-Sheet 3

Feb. 12, 1935. H. A. FOOTHORAP 1,990,480
TABULATING MECHANISM FOR TYPEWRITING MACHINES
Filed July 24, 1930 6 Sheets-Sheet 5

Inventor,
Harry A. Foothorap.

Patented Feb. 12, 1935

1,990,480

UNITED STATES PATENT OFFICE 1,990,480

TABULATING MECHANISM FOR TYPEWRITING MACHINES

Harry A. Foothorap, Harrisburg, Pa., assignor, by mesne assignments, to Underwood Elliott Fisher Company, New York, N. Y., a corporation of Delaware Application July 24, 1930, Serial No. 470,520

35 Claims. (Cl. 197—2)

My invention relates to tabulating mechanism for typewriting machines, and more particularly to improvements in line space tabulating mechanism for flat platen machines of the class equipped with a travelling printing head, mounted on a line space carriage, for line and letter spacing of the printed record.

In my co-pending application Serial No. 135,210, now U. S. Letters Patent No. 1,904,127, issued April 18, 1933, there is disclosed an exemplification of this class of typewriting machine, to-wit, the Elliott-Fisher Billing machine, embodying a motor drive operative to propel the line space carriage and printing head freely over the platen either in forward or backward line spacing direction.

It is the principal object of my invention to equip a machine of the above class for instant selection of any line position within the range of its operating capabilities, and for accurate line space tabulation to any selected line position, without shock or jar to the mechanism of the machine.

Objects ancillary to the above are to automatically control the motor so as to prevent overthrow of the line space carriage or frame, by said motor in line tabulating operations; to absorb both overthrow and rebound shock of the line space carriage or frame and the printing head; and to center the same in exact line location.

Still another object is the provision of a large field of settable stops to variously arrest a travelling carriage stop, the field of settable stops being constructed and arranged to permit the passage of the travelling stop through the field into engagement with any selected stop that has been set into obstructing or arresting position.

My invention also comprehends means for mounting a large number of key-set stops in compact spaced-apart arrangement, in correspondence with the distance between single line spacings, to provide an individual stop for each line position which the line space carriage or frame is capable of assuming, the invention also including means for identifying each line position and its corresponding stop.

To the accomplishment of the foregoing and other objects, as will presently appear, there has been illustrated in the accompanying drawings, a preferred embodiment of my invention which will now be described in detail and particularly defined in the claims appended hereto.

Figure 2:
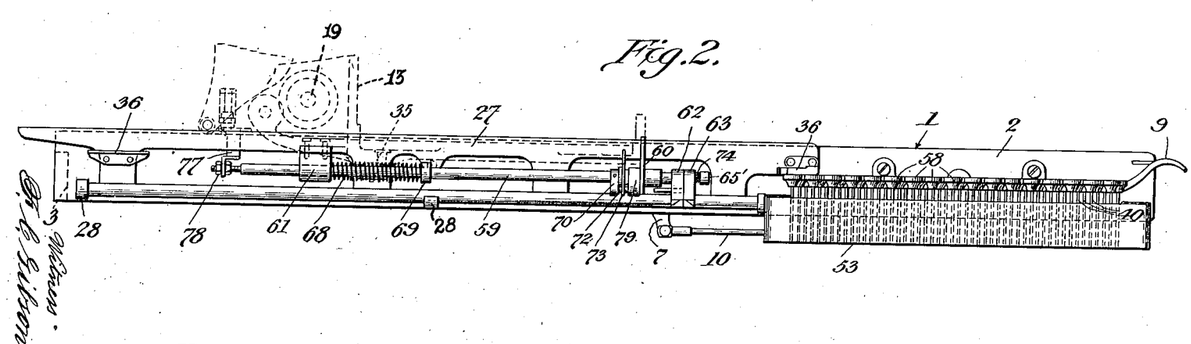
Figure 2 is a view in side elevation looking toward the left side of the machine, with the printing head omitted and with parts shown in dotted lines.
Figure 3:
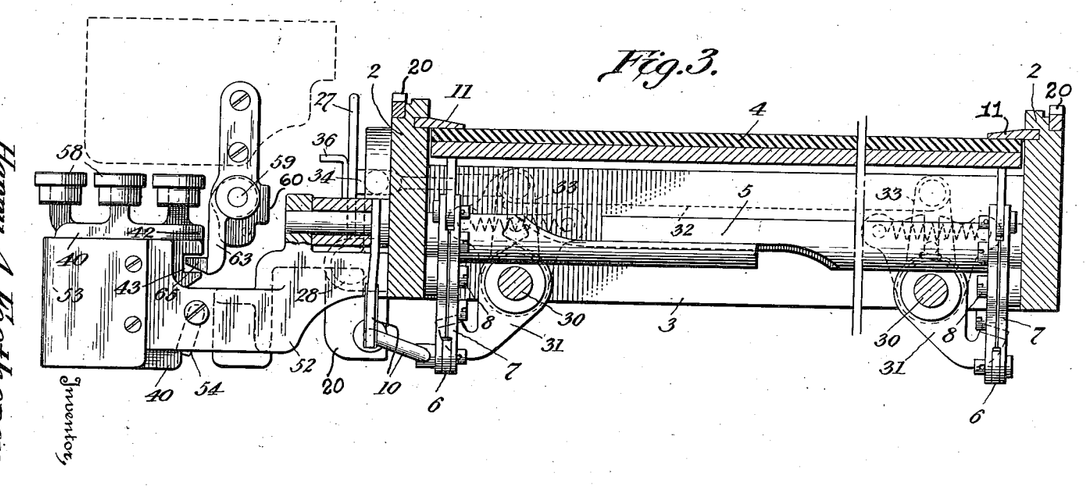
Figure 3 is a detail view in transverse section taken on the line 3—3 of Figure 1.

Referring to the Elliott-Fisher machine shown in the drawings, 1 (Figs. 1 and 2) designates the usual track frame thereof formed by the side and end members 2 and 3, respectively. The numeral 4 designates the usual flat platen movable in the frame toward and from the writing plane by platen operating mechanism, the primary element of which in this instance, is the rock shaft 5, (Fig. 3). Said shaft 5 is journaled in the side members 2 and is operatively connected by arms (not shown), and links 6 to toggle levers 7 pivoted at 8, and functioning to lower the platen 4 against the urge of tension platen elevating devices, not shown herein, but fully disclosed in my co-pending application for patent, filed July 24, 1930, Serial No. 470,519. The shaft 5 is rocked through the medium of a hand lever 9, (Fig. 1) and a suitable link connection 10 (Fig. 3). The function of the platen operating mechanism, as will be understood, is to clamp work sheets, or forms, between the platen and the marginal clamping bars 11, and to effect their release by lowering the platen. Since a detailed disclosure of the platen operating mechanism is not essential to a proper understanding of my invention it has merely been illustrated conventionally. The elements 12 (Fig. 1) are the usual spindles with which these machines are equipped for guiding forms to the platen 4.

The line space carriage 13, (Figs. 1, 4 and 5) sometimes called the frame, but hereinafter designated the carriage, includes the front and rear frame members 14 and 15, respectively, (Figs. 1 and 4) and the side members 16. Front and rear rollers, for instance, as shown at 17, (Fig. 1) support the carriage 13 upon tracks 18 formed by the frame side members 2 and upon which the line space carriage is movable forwardly and reversely over the platen 4.

The rear carriage rollers 17 are fast upon a carriage driving shaft 19 (Fig. 1) journaled in said carriage and geared to racks 20 on the side members 2, by means of toothed pinions 21. The carriage driving shaft 19 and pinions 21 constitute part of a line spacing mechanism for these machines, the function of which is to move the carriage 13, and parts carried thereby, forwardly or rearwardly through line space intervals. Since we are not concerned with the remainder of this mechanism, it has not been illustrated, but reference may be had to my co-pending application supra for a complete disclosure of this part of the machine.

Referring briefly to the motor drive, the motor 22 (Fig. 1) drives the carriage driving shaft 19 forwardly or reversely through the medium of a motor control shaft 23 endwise movable to effect engagement and disengagement of suitable forward and reverse driving clutches (not shown) housed in the casing 24. The motor control shaft 23 and carriage driving shaft 19 are connected by gear pinions 25 and 26, respectively, the control shaft pinion 25 being splined on its shaft to permit endwise movement of said shaft without shifting said gear out of mesh with the driving shaft gear. Endwise movement of the motor control shaft 23 in opposite directions from a neutral or drive-disconnecting position, determines the direction of the drive, and is effected by a rocking control bail 27 (Figs. 1 and 3) pivoted, as at 28, to one side member 2 of the track frame and engaged by a grooved wheel 29 fast on said control shaft 23 and travelling on said bail. The control bail 27 is ordinarily rocked manually by means of mechanism, including shafts 30, stop arms 31, (Fig. 3), and an arrangement of links and levers 32 and 33, respectively, connecting the shafts to the bail, as at 34. As the line space carriage nears its limits of movement in either direction a lug 35 thereon (Fig. 1) engages cams 36 on each end of the bail 27 and automatically returns the latter, together with the motor control shaft 23, to drive disconnecting position.

For further details of the motor drive, reference may be had to my beforementioned co-pending application, Ser. No. 135,210 now Patent No. 1,904,127.

The printing head, indicated conventionally at 37, is mounted by the usual rollers, as at 38, (Fig. 4) on the line space carriage 13, and is operative thereon for letter spacing under control of the usual spring motor and escapement mechanism (not shown), since they are well known and understood in the art.

Coming now to the various features of my invention, the clamping bars 11, which are co-extensive in length with the platen 4, are provided with graduations 39, (Fig. 1) spaced apart in accordance with single line intervals, and extending the full length of said bars. At least every other graduation is designated with the number of the corresponding line so that the operator may instantly locate any line position on a work sheet clamped beneath said bars.

Located, preferably, adjacent the left forward corner of the track frame 1 is a row or field of individual line tabulating stops 40, one for each graduation 39. The line tabulating stops take the form of vertically disposed hollow rectangular keys spaced apart, laterally, on a stop mounting 41, (Figs. 8 to 13 inclusive) in correspondence with the graduations 39.

Figures 10, 11, 12, 15, 16, 17:
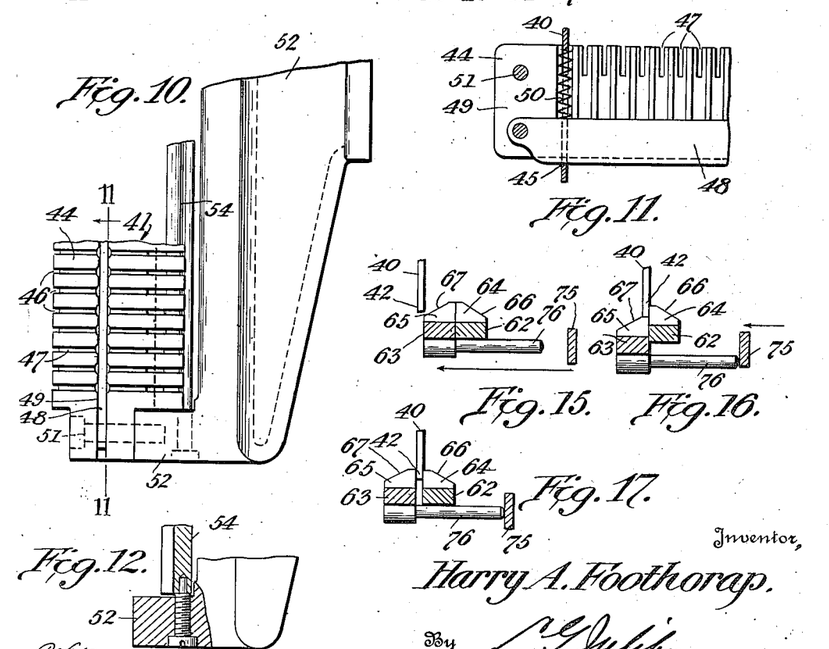
Figure 10 is a fragmentary top plan view of the mounting for the key-set stops.
Figure 11 is a sectional view taken on the line 11—11 of Figure 10.
Figure 12 is a detail horizontal sectional view of the locking mechanism for the key-set stops.
Figure 15 is a plan view, partly in section illustrating the normal position of a pair of carriage tabulating stops, respectively, travelling with the line space carriage and co-acting with the key-set stops.
Figure 16 is a similar view illustrating an intermediate step in the operation of the parts shown in Figure 15.
Figure 17 is another similar view illustrating the final step in the operation of said parts.
Figure 13:
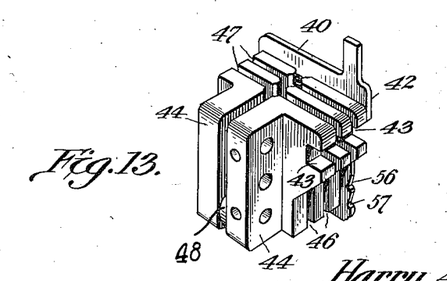
Figure 13 is a detail perspective view of the mounting for the key-set stops.
Figure 14:
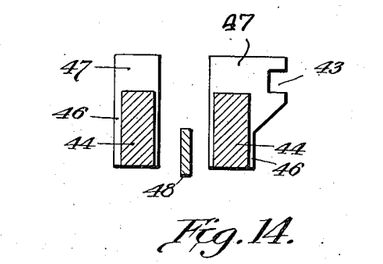
Figure 14 is a transverse sectional view of the dis-assembled parts of the mounting for the key-set stops.

The stop mounting extends parallel with the adjacent rail 2 of the track frame, from which it is spaced and to which it is attached, by a bracket 52. Arms projecting outwardly from the opposite ends of the bracket embrace the field of tabulating stop keys 40, and serve to support the opposite ends of a pair of parallel oblong, supporting blocks 44 passing through the hollow centers of the rectangular tabulating stop keys. The opposite ends of the blocks 44 are reduced, as shown in Figs. 10 and 13, to form flanges which are securely bolted at 51 to the outer faces of the arms of the bracket. The outer side and the upper face of each of the oblong supporting blocks 44 are correspondingly grooved, as shown at 46 and 47, (Figs. 10 and 13) to correspond with the line space intervals and the graduations 39 on the clamping bars 11, such grooves adapted to accommodate the walls forming the inner perimeters 45 of the hollow tabulating keys 40 to guide the keys in their vertical travel.

The opposed inner faces of the parallel key-supporting blocks are drilled in parallelism with the guide slots 46 to form spring chambers in the channel 49 between the opposed faces of the blocks 44, (see Figs. 10 and 11) to accommodate springs 50 (Figs. 8, 9 and 11) seated at their lower ends on a common spreader bar and spring seat 48, the upper ends of which springs bear against the upper cross pieces of the hollow tabulating keys 40 to normally hold them in elevated positions near the upper ends of their grooves 47.

It will be understood that the hollow tabulating keys 40 are strung on the parallel supporting blocks 44 and positioned in the grooves 47 prior to the introduction of the spreader bar 48 between the supporting blocks.

The skeletonized rectangular keys 40, therefore, enclose the blocks. The spreader bar and spring seat 48 is held in place between the supporting blocks 44 near the lower edges of the blocks, by the same bolts 51 that secure the blocks to the outer ends of the arms of the bracket 52, the spreader bar operating to hold the supporting blocks apart and maintain the channel 49.

The inner of the two supporting blocks 44 is provided on its exterior face with a longitudinally extending rib intersected by the horizontal and vertical grooves 47 and 46, resulting in the formation of a plurality of tongues projecting towards the body of the casting 41, the rib being further slotted longitudinally, as at 43, to form a horizontal clearance notch in each of the tongues.

Each of the upper cross bars of the respective hollow rectangular keys 40 is extended beyond its inner vertical stile to form an ear or stop 42, which, in the normal elevated position of the key, lies above and overhangs the plane of the longitudinal notch or slot 43 in the inner supporting block 44.

Figures 8, 9:
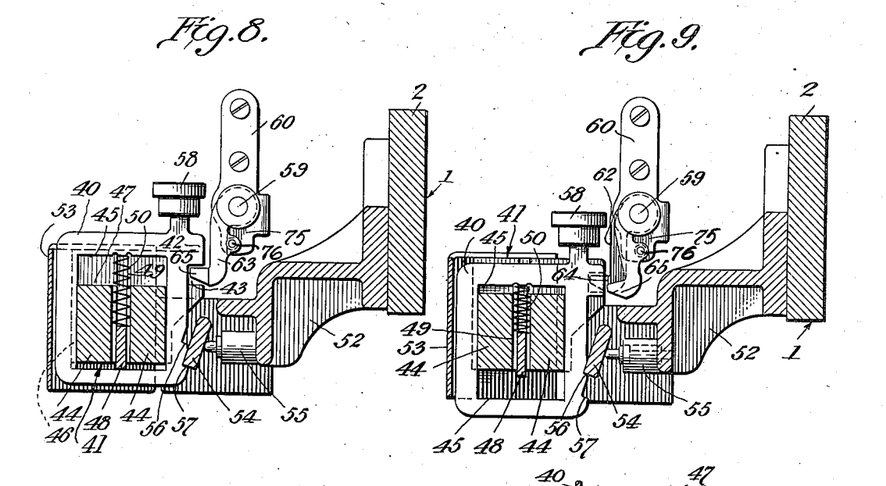
Figure 8 is a view in transverse section illustrating one of the key set stops, co-acting stops on the line space carriage, and a mounting and locking mechanism for the key-set stops.
Figure 9 is a similar view illustrating the operation of the parts shown in Figure 8.

The tabulating stops 40 are arranged for selective depression into set positions in which their ears 42 obstruct the longitudinal groove 43, (Figs. 8, 9 and 13) at predetermined points in its length. A guard plate 53 covers the exterior face of the outer supporting block 44, as shown in Figure 8.

A horizontally extending stop locking blade 54 (Figs. 8, 9 and 10) common to all the tabulating stops 40, is journaled at its ends in the arms of the bracket 52 so that its lower edge may swing into engagement with the inner edges of the stops 40 and urged into stop engaging position by suitably located, tensioned plungers 55. The engaged edge of each stop 40 is provided with an upper locking notch 56 in which the locking blade 54 seats in the depressed position of the stops, and a lower unlocking notch 57 in which said blade seats in the normal elevated position of said stops. Upon partial depression of any stop 40, the wall of the unlocking notch 57 cams the locking blade 54 into a releasing position. Hence, depression of any stop 40 releases a previously set stop and by a partial depression of any stop, the entire row of stops 40 may be "cleared" without locking any other stop in depressed position.

Individual line tabulating key tops 58 are provided on the stops 40 for setting the same, the key tops being mounted on the stops 40 to present parallel rows, (Fig. 1), and the keys of each row are staggered with respect to those of the other rows to facilitate close spacing of said stops.

Returning now to the line space carriage 13, a tabulator shaft 59 (Figs. 1 to 9 and 18 to 20) is freely mounted thereon beneath and parallel with a side bar 16, in depending front and rear brackets 60 and 61, respectively, to normally move or travel endwise with the carriage in a path parallel with and adjacent to the stops 40. The front end of the tabulator shaft projects forwardly of the front bracket 60 and has mounted thereon, one in advance of the other, a pair of depending forward and reverse traveling carriage tabulating stops 62 and 63, respectively.

During forward, i. e. in the direction of normal line spacing, movement of said shaft 59 and carriage 13, the forward and reverse carriage tabulating stops 62 and 63 and a set stop 40 automatically interlock to first arrest forward, and then reverse or rebound, movement of the shaft 59. To this end, said forward and reverse carriage tabulating stops 62 and 63 are provided with laterally projecting lugs 64 and 65, (Figs. 23 and 24) respectively, designed, in the normal position of said stops, to travel in the longitudinal slot 43 of the inner stop supporting block 44 to grip the ear 42 of a key-set stop 40 therebetween. The forward carriage tabulating stop 62, which initially arrests the carriage on its forward or advance travel, is fast on the shaft 59, and the reverse carriage tabulating stop 63 to prevent rebound is free thereon. The lugs 64 and 65 are provided with oppositely angled edges 66 and 67 (Figs. 15, 16, 17) respectively, whereby the forward tabulating stop 62 will wipe over a stop ear 42 during rearward movement of the tabulating shaft 59, and the reverse tabulating stop 63 will function in a like manner during forward movement of said shaft, for a purpose presently seen.

Figures 4, 21, 22, 23, 24, 25, 26, 27, 28, 29:
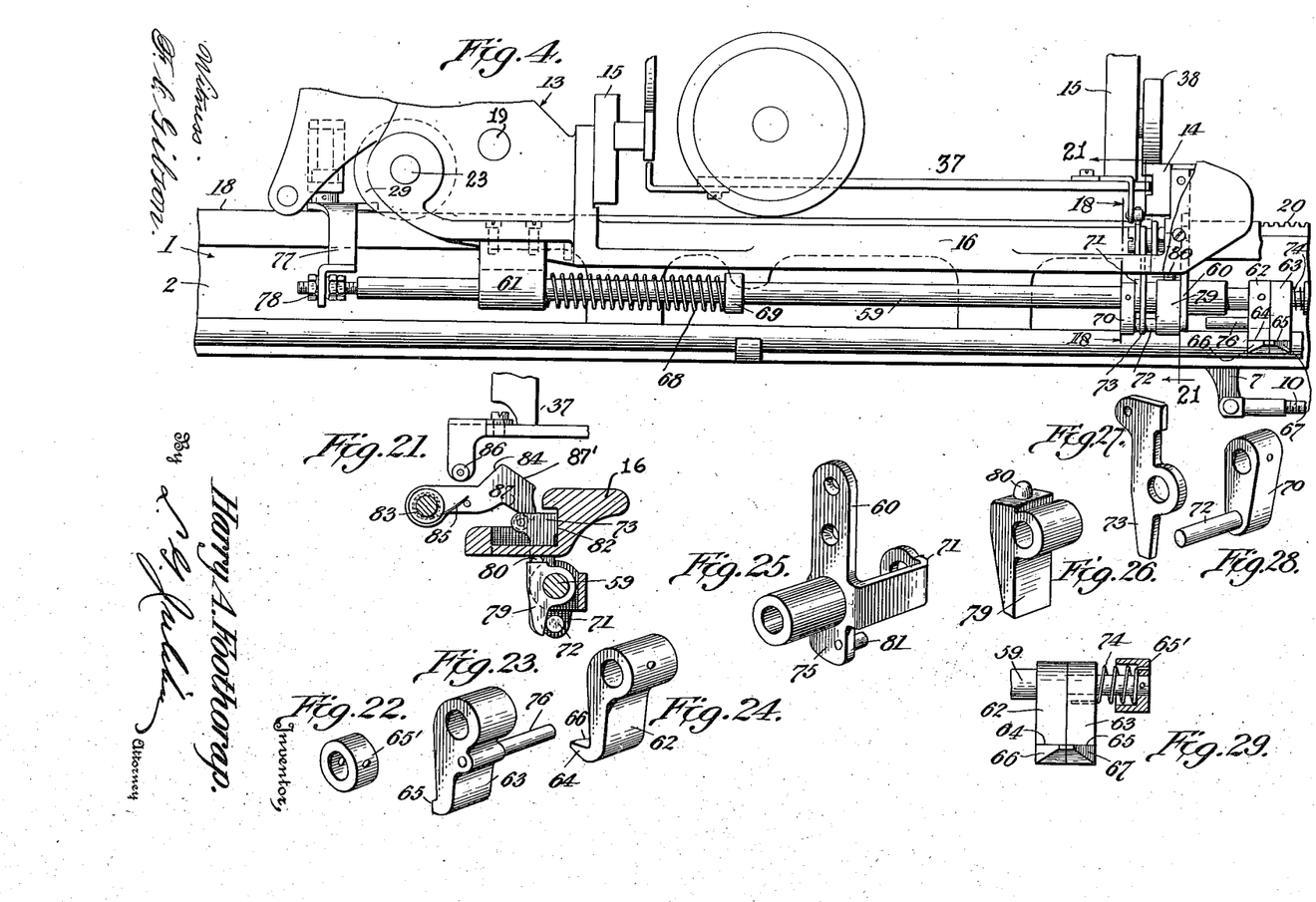
Figure 4 is a fragmentary view similar to Figure 2, and drawn on an enlarged scale.
Figure 21 is a detail view taken on the line 21—21 of Fig. 4 showing the unlocking mechanism and said carriage centering stop viewed from the opposite direction.
Figure 22 is a perspective view of a collar associated with one of the carriage tabulating stops.
Figure 23 is a perspective view of one of the carriage tabulating stops and a carriage locating stop mounted therein.
Figure 24 is a perspective view of the other carriage tabulating stop.
Figure 25 is a perspective view of a bracket for supporting the carriage tabulating stops on the carriage.
Figure 26 is a perspective view of a carriage centering stop.
Figure 27 is a perspective view of an unlocking lever forming part of the beforementioned unlocking mechanism.
Figure 28 is a perspective view of another carriage locating stop.
Figure 29 is a view in rear elevation of the carriage tabulating stops.
Figures 5, 6:
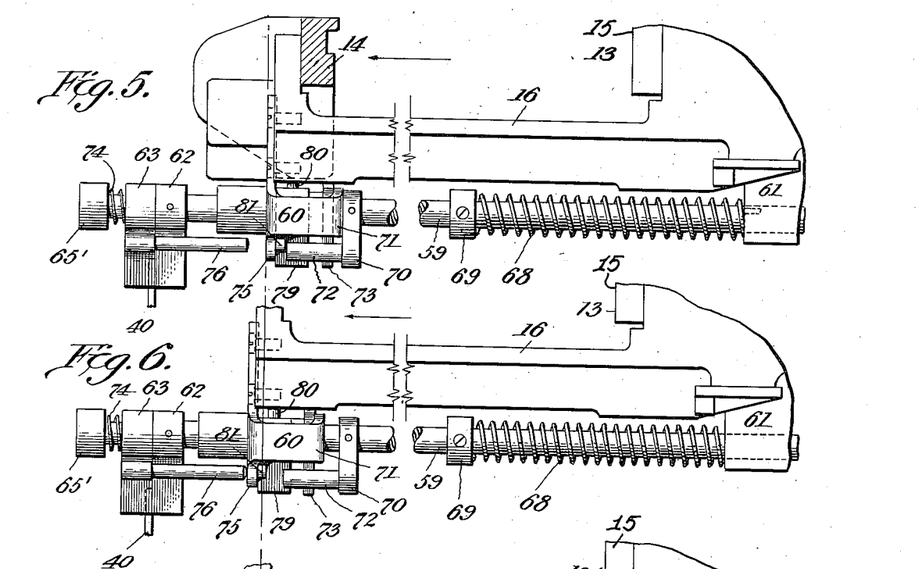
Figure 5 is a fragmentary view in side elevation of the line space carriage and parts of my novel tabulating mechanism, illustrating the positions of the parts just prior to the location of the line space carriage in a selected line position.
Figure 6 is a similar view illustrating the position of the parts during an intermediate step in a line tabulating operation.

A primary shock absorbing element in the form of a combined torsional and expansion spring 68 (Figs. 1, 2 and 4 to 7) located on the shaft 59 bears at its opposite ends against the rear bracket 61 and a set collar 69 fast on said shaft to which bracket and set collar, the opposite ends of the spring 68 are secured, see Fig. 5 to enable the spring to restore the shaft to normal position after the shaft has been rotated out of normal, as when the angular face 66 of the carriage stop 62 wipes past a set tabulating stop 40, on the return travel of the line space carriage towards the rear of the platen. It will be apparent that the spring 68 yieldingly restrains the shaft against longitudinal movement, and tends to maintain the angularly extending lips 64, 65 of the carriage stops 62, 63, in the path defined by the alined notches 43 (Fig. 9) in position to co-act with the ear 42 of the set tabulating stop 40.

Forward movement of the tabulating shaft 59 relatively to the carriage 13 is prevented by a depending crank arm 70 fast on said shaft engaging a limiting stop 71 (Figs. 5 to 7) formed by the rear face of the bracket 60. A stop pin 72 projecting forwardly from the lower end of the crank arm 70, parallel with the shaft 59, engages the lower right hand edge (as viewed from front of machine, (Fig. 18) of a normally stationary vertical restraining lever 73 pivoted intermediate its ends on and slidable along the shaft 59 with the carriage. The torsional energy of the spring 68 operating to rotate the tabulating shaft 59 and its crank arm 70, presses the stop pin 72 against the lower end of the stop lever 73 to rock the lower end of the lever outwardly and press the upper end against the outer face of the side bar 16 of the line space carriage, which arrests the stop lever 73, and prevents rotative movement of the forward tabulating stop 62 beyond its normal position under the urge of the spring 68. The crank arm 70, stop pin 72, and lever 73 also perform other functions presently described.

A secondary shock absorbing element in the form of a shorter expansion spring 74 (Figs. 5 to 7, and 29) located on the tabulator shaft 59 bears at its opposite ends against the reverse carriage tabulating stop 63 and a cap 65' fixed to the forward end of said shaft. The ends of the spiral spring 74 are connected to said stop and cap to yieldingly urge the reverse carriage tabulating stop 63 in a clockwise direction as viewed in Figs. 8 and 9 to position its end 65 in the path defined by groove 43, and in side by side engagement with the forward carriage tabulating stop 62. A stop pin 76 projecting rearwardly from the reverse carriage tabulating stop 63, and behind the forward carriage tabulating stop 62, parallel with the shaft 59, bears against the said stop 62, which prevents rotative movement clockwise (Fig. 8) of the reverse carriage tabulating stop 63 beyond its normal position under the urge of the spring 74. The stop pin 76 performs other functions presently explained.

The operation of the parts as so described is as follows: Assume the line spacing carriage 13 to be at the rear of the platen 4. A line position having been selected and the appropriate stop 40 depressed, the motor control bail 27 (Figs. 1–3) is manually rocked in the proper direction, i. e., inwardly, toward the frame 1, to cause the motor 25 to drive the carriage 13 forwardly.

The line space carriage 13, on its advance, carries with it the tabulating shaft 59 with its main and rebound preventing stops 62, 63, and the motor control shaft 23 (Fig. 1), the grooved roll 29 of which rides along the upper free edge of the motor control bail 27 pivoted on the stationary track frame 1.

As the line space carriage 13 approaches the key-set tabulating stop 40, the projecting lips 65, 64 of the carriage stops 62, 63 enter the groove 43 and the cam face 67 on the lip 65 of the rebound-preventing stop 63 wipes past the ear 42 of the tabulating stop 40, which rocks the rebound preventing stop in counter-clockwise direction (Figs. 8 and 9) against the tension of the spring 74, to uncover the abrupt face of the main carriage stop 62.

As the rebound-preventing stop 63 is cammed aside, (Figs. 9 and 16) the main carriage stop 62 collides with, and is arrested by, the ear 42 on the key-set tabulating stop 40, thereby arresting farther advance of the tabulating shaft 59 to which the stop 62 is fast.

Since line space carriage 13 and the shaft 59 are relatively slidable, the line space carriage 13 is not brought to an abrupt stop at this moment, but instead, slides along the shaft 59 slightly under the momentum acquired on its advance, and compresses the spring 68 which acts to cushion the line space carriage and bring it to rest without shock or jar.

The slight advance of the line spacing carriage 13 relatively to the tabulating shaft 59 is utilized to prevent rebound of the shaft relatively to the tabulating stop 40, in the following manner.

The carriage 13, with its tabulating shaft 59 and the main and rebound stops 62, 63, are shown in Fig. 5, in the positions occupied at the moment the main carriage stop 62 abuts the key set tabulating stop 40. The front face 75 of the line space carriage bearing 60, upon the slight continued advance of the line space carriage following the arrest of the carriage stop 62, strikes the free rear end of the restraining stop pin 76 extending rearwardly of the machine from the rebound-preventing stop 63, as shown in Figs. 6 and 16, and forces the rebound-preventing stop forwardly along the tabulating shaft 59 against the tension of its restoring spring 74, to the position illustrated in Figs. 7 and 17.

The rebound-preventing stop is thus slid past the free end of the ear 42, whereupon the torsion spring 74 immediately snaps the stop 63 around so that its abrupt face lies in contact with the front face of the ear. The advance imparted by the centering stop 75 to the rebound-preventing stop 63 along ahe tabulating shaft 59 is sufficient to take up substantially the amount of play allowed between the stop 63 and the cap 65' so that by snapping the stop 63 in front of the ear 42 while the main stop 62 is resting against the rear face of the ear, the tabulating shaft 59 is locked against rebound.

The cushioning action of spring 68 to decelerate the movement of the carriage after shaft 59 has been arrested, is augmented by the spring 74 as an incident to the movement of the carriage relatively to the tabulating shaft 59. Referring again to Figs. 5, 6 and 7, it will be seen that the movement of the dog 63 from the position of Figs. 5 and 6 to the position shown in Fig. 7 must be accomplished against the compressive resistance of spring 74. Thus, the spring 74 supplements the action of spring 68 to bring the carriage to rest and so serves as a secondary shock absorbing medium.

Figure 1:
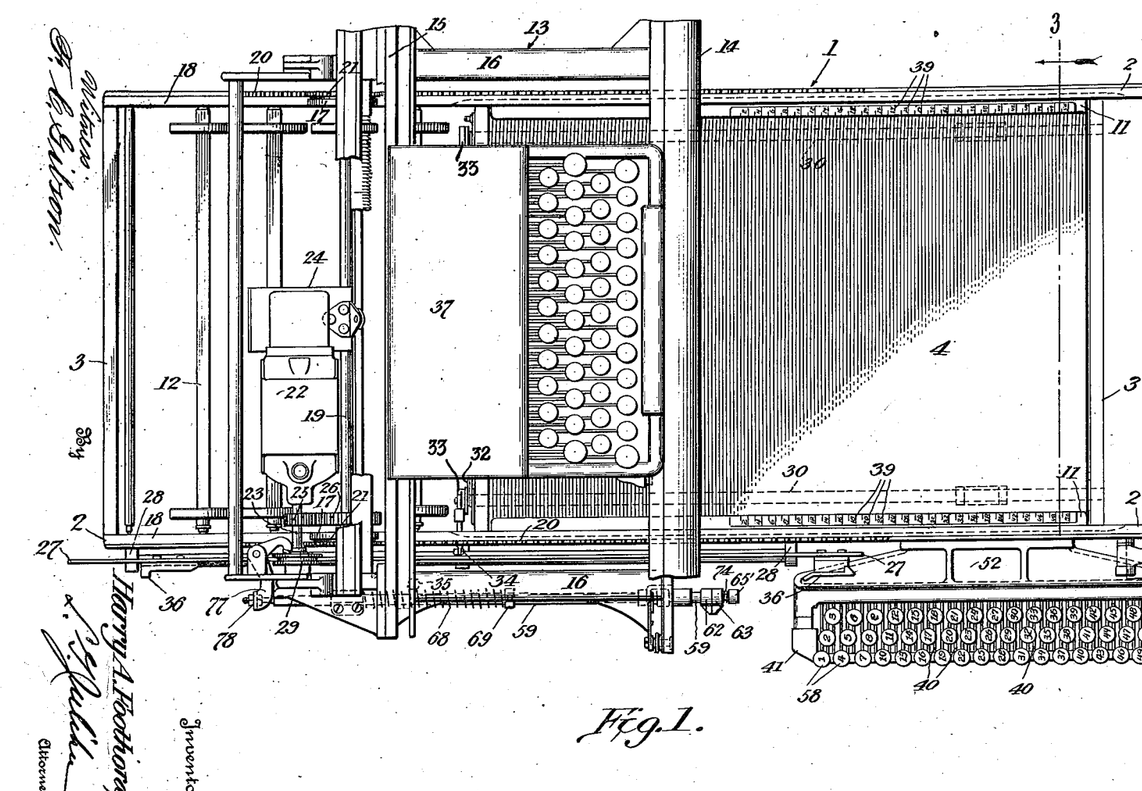
Figure 1 is a top plan view illustrating my novel line tabulating mechanism applied to the Elliott-Fisher Billing machine before mentioned.

Relative movement of carriage 13 with respect to shaft 59 is utilized to actuate means effective to disengage the carriage driving mechanism. Referring particularly to Figs. 1, 2 and 4, a bell crank motor control lever 77 pivotally mounted on the carriage 13, has one of its arms operatively connected at 78 to the rear end of the tabulating shaft 59. The other arm of bell crank 77 bears against the inner face of the grooved wheel 29 which, in turn, rides upon the motor control bail 27. The arrest of the tabulating shaft by contact of its stop 62 with a set tabulating stop 40, followed by the slight continued advance of the line space carriage 13 with respect to the tabulating shaft, rocks the bell crank lever 77 clockwise (in Fig. 11) to force the wheel 29, and hence the bail 27, to their neutral or drive-releasing position.

Means effective to arrest the line space carriage in a predetermined position with respect to the tabulating shaft to define a writing line is also provided. In the present embodiment of the invention, the relative movement between the carriage and its tabulating shaft is utilized to effect the beforementioned positioning of the carriage to define the writing line.

Figure 7:
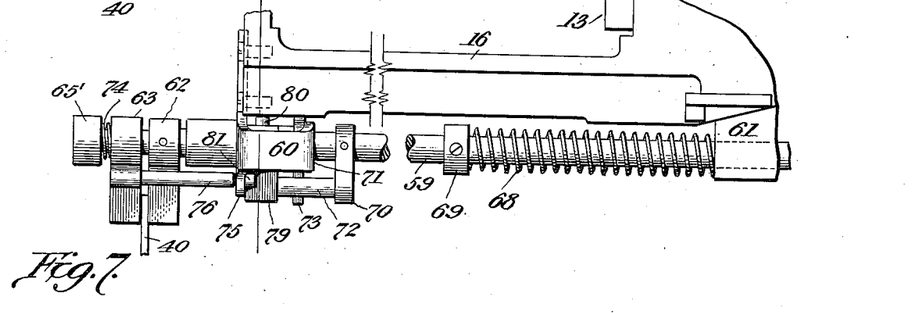
Figure 7 is another similar view illustrating the final position of the parts in a line tabulating operation.

Referring to Figs. 5 to 7, inclusive, 18 to 21, inclusive, and 26, a carriage centering stop 79 comprising a depending arm and a relatively shorter upwardly extending arm, is loosely mounted on the tabulating shaft 59 intermediate the spaced journals of the yoke-shaped bearing 60, with its respective arms extending eccentrically of the axis of the shaft, and its depending arm projecting below the axis of stop pin 72 projecting laterally from the crank arm 70 fast on the tabulating shaft. Any desirable means, such as a spacing collar, may be employed to maintain the stop 79 in bearing engagement with the rear end surface of the forward, journal-functioning portion of the bracket 60, as is shown in the drawings, so as to travel with the carriage. A spring-actuated plunger 80 mounted in the upper arm of the centering stop 79 acts against the lower surface of the side rail 16 of the carriage and, by virtue of its eccentricity with respect to the axis of shaft 59, tends to rotate the stop 79 in a counter-clockwise direction as viewed from the front of the machine, or as shown in Fig. 21. Thus, the plunger 80 normally tends to retain the depending arm of its centering stop 79 in contact with the reverse carriage locating stop pin 72.

Referring particularly to Figs. 5, 6 and 7, it will be seen that, as the carriage continues its advancing movement after the tabulating shaft 59 has been arrested, the bearing 60 will be moved leftwardly with the centering stop 79, (Figs. 6 and 7) the pin 72 remaining stationary because of its rigid connection with the shaft. As the centering stop 79 moves beyond the left end of pin 72, as shown in Fig. 7, the plunger 80 acts to rotate stop 79 in a counter-clockwise direction to interpose its lower end in the path of pin 72. A lug 81 on the inner face of the bearing 60 projects towards the stop pin 72 and functions to limit the arcuate movement of stop 79. The centering stop, therefore, takes up the "play" provided between the line space carriage and the tabulating shaft 59, and holds the line space carriage substantially in its farthest advanced position. Thus, the carriage becomes locked against rearward, or rebound movement, (to the right as viewed in Figs. 5, 6 and 7) relatively to the shaft 59, under the influence of the abnormally compressed spring 68, and displacement of the shaft and carriage as a unit is resisted by the already compressed spring 74 acting between the shaft cap 65' and the stop 63, the latter in turn abutting the positioned stop ear 42. It will also be noted that compressed spring 68, through shaft collar 69 and bracket bearing 61 together with spring 74, in the manner previously explained, resist forward displacement of the carriage.

Hence, the relative movement of carriage 13 and shaft 59 operates to compress both springs 68 and 74 to condition the latter to restrain the carriage against displacement from its advanced columnar position.

The line space carriage 13 with its tabulating shaft 59 is released preparatory to a farther advance, or for return of the carriage and its printing head 37 towards the rear of the platen, by unlocking mechanism automatically actuated by the printing head 37, when shifted from the right towards its left hand marginal position to begin a new line.

The unlocking mechanism utilizes the restraining lever 73, the upper arm of which bears against an abutment face 82 formed on the side bar 16 of the line space carriage (see Figs. 18-21), the lower arm of the lever projecting into the arcuate path of travel of the pin 72 on the restraining arm 70 to limit rotation of the tabulating shaft in one direction.

The free angular end of an unlocking cam lever 84 pivoted at its opposite end, at 83, to the line space carriage 13, is provided with opposed convex and concave cam edges 87' and 87, respectively. A spring 85 presses the cam lever downwardly to hold the concave cam edge 84' lightly in contact with a roller 88, carried at the upper end of the restraining lever 73.

A roller 86 is mounted on the printing head 37, which roller, as the printing head is returned towards its left hand margin, wipes over the convex cam edge 87' of the unlocking lever 84 to rock the latter downwardly and cause the concave cam 87, acting upon the roller 88, to rock the restraining lever 73 clockwise to the position shown in Fig. 20.

Figures 18, 20:
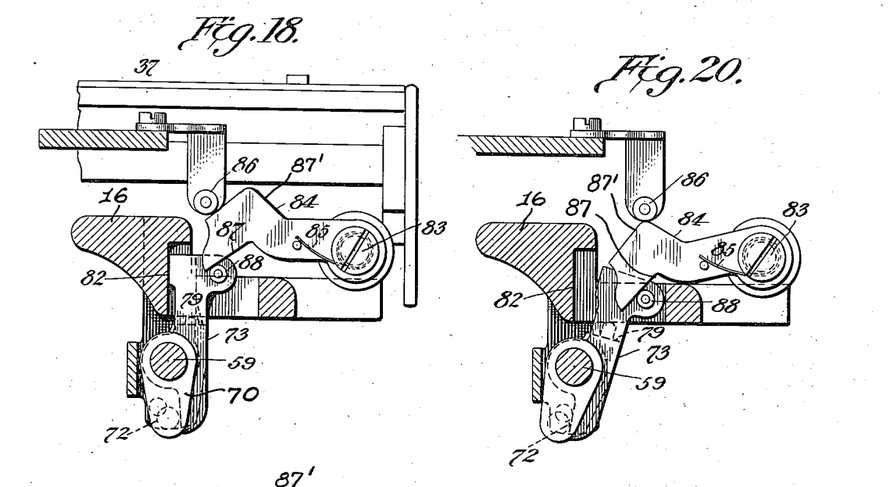
Figure 18 is a transverse sectional view taken on the line 18—18 of Figure 4, illustrating an unlocking mechanism included in my novel line tabulating mechanism.
Figure 20 is another similar view illustrating the operation of the unlocking mechanism and said carriage centering stop.
Figure 19:
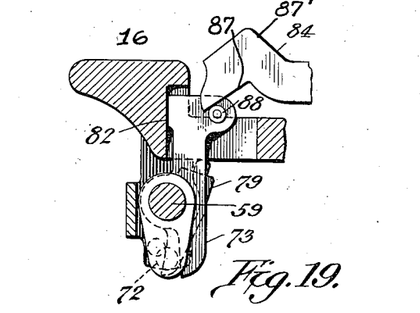
Figure 19 is a similar view illustrating the operation of a carriage centering stop co-acting with parts of the unlocking mechanism.

The restraining lever 73, on such clockwise movement, presses against the lateral stop pin 72 of the crank arm 70 fast on the tabulating shaft 59 and rocks the shaft clockwise (counter-clockwise in Figs. 8 and 9) against the tension of the spring 68 to disengage the main carriage stop 62, likewise fast on the shaft 59, from the key-set tabulating stop 40.

Since the laterally extending pin 76 of the rebound-preventing stop 63 lies behind the carriage stop 62, rearward rocking of the stop 62 will likewise disengage the rebound-preventing stop 63 from the set tabulating stop 40, whereupon the secondary spring 74 snaps the rebound-preventing stop 63 axially rearward along the tabulating shaft 59 until arrested by contact with the main carriage stop 62.

Substantially simultaneously with the foregoing results, the restraining lever 73, when rocked by the unlocking lever 84, displaces the free end of the stud 72 from contact with the rear edge of the carriage centering stop 79, and upon the release of the main carriage stop 62 from the key-set tabulating stop 40, as above explained, the tabulating shaft 59 is free to advance under the influence of the compression stored in the spring 68, to introduce the free end of the restraining stud 72 behind the carriage centering stop 79.

The carriage centering stop 79 is, as yet, in the position to which it rocked under the influence of the spring plunger 80.

The tabulating shaft 59, when advanced by the spring 68, carries with it the main carriage stop 62 and the rebound-preventing stop 63, to locate the main carriage stop in front of the key-set tabulating stop 40, in readiness to advance to a succeeding selected line space, if desired.

The spring 68 will operate to shift the tabulating shaft 59 axially in forward direction rather than to shift the line space carriage rearwardly, because of the presence of the usual line space carriage brake mechanism (not shown but common to Elliott-Fisher machines) which resists accidental movement of the carriage and also because of the resistance opposed by the weight of the carriage.

When the printing head 37 in its travel, releases its roll 86 from the convex cam edge 87' of the unlocking lever 84, the pressure of the unlocking lever on the upper end of the restraining lever 73 is relieved, whereupon the spring 68 acts torsionally upon the tabulating shaft 59 to restore the parts to their normal positions. The spring 68 rotates the tabulating shaft 59 clockwise (Figs. 8 and 9) and in so doing, rocks the crank arm 70 and its stud 72 which now lies behind the centering stop 79 to rock the latter outwardly to its idle position, out of the path of the abutment 81 on the bearing 60, whereby to provide a clearance for relative movement between the tabulating shaft 59 and the line spacing carriage, upon the next tabulating operation, as heretofore explained.

The upper arm of the restraining lever 73, by contact with the opposing face of the side bar 16 of the line space carriage frame, arrests the stud 72 and the shaft 59, together with the carriage stop 62 in their normal positions.

The shaft 59, on its advance incident to the release of the carriage stop 62 and rebound-preventing stop 63 from the set tabulating stop 40, rocks the free end of the bell crank 77 (Figs. 1, 2 and 4) away from the grooved motor control wheel 29, to enable the latter to be shifted inwardly in case it is desired to drive the line space carriage to an advanced writing line, as determined by the depression of the corresponding tabulating key 40.

In general, however, the line space carriage, after one line of writing is completed, is shifted rearwardly to uncover the work sheet for removal and the substitution of a different sheet, through operation of the proper motor drive control 30 (Fig. 1).

The set tabulating stop 40 will not interfere with the return of the line space carriage toward the rear of the machine, as the cam edge 66 (Figs. 15, 16, 17 and 29) on the projecting lip 64 of the main stop 62 will wipe past the ear 42 of the key-set stop 40, and be cammed thereby to rock the main stop and its shaft 59 counter-clockwise (Figs. 8 and 9) against the tension of the spring 68, the stop 62, in turn, by contact with the stud 76, rocking the rebound-preventing stop 63 against the tension of its spring 74 to position to avoid contact with the front face of the key-set stop.

The spring 68, operating on the tabulating shaft 59, will snap back to normal, as soon as the lip 64 escapes the stop 40, thus releasing the rebound-preventing stop 63 for return by its spring 74, but at this moment, the blunt end of the lip 65 of the rebound-preventing stop 63 lies opposite the edge of the ear 42 which maintains the rebound-preventing stop 63 displaced until such stop itself escapes the ear 42.

It will be noted that the tabulating stop release or unlocking lever 84 is located adjacent, but not at the left hand limit of travel of the printing head 37. As a result, the unlocking lever will be operated, as the printing head approaches its left hand limit of travel, and again as it leaves such limit.

Since the beginning of the writing line lies to the right of the cam edges of the unlocking lever 84, it is not customary, in using this machine, to tabulate the line space carriage in line spacing direction until the printing head has advanced towards the right, past the point of contact of the roll 86 with the unlocking lever 84, and the double operation of the unlocking lever 84 by the printing head insures the return of the line space tabulating mechanism (except the set key 40) to normal prior to another tabulating operation.

Changes and alterations may be made in the form and arrangement of the several parts described without departing from the spirit and scope of the invention.

What I claim is:—

1. In a typewriting machine, the combination with a frame, a travelling carriage, and a motor drive for the carriage, of tabulating stops on the frame and carriage, respectively, automatically interlocking during travel of the carriage, means for automatically disengaging the motor drive during interlocking of said stops, and means operating automatically as an incident to operation of the machine to begin a new line, to unlock said stops.

2. In a typewriting machine, the combination with a frame and travelling carriage adapted to define a succession of writing lines extending from left to right and spaced apart normally to the writing direction, of a tabulating stop on the frame, a pair of tabulating stops on the carriage automatically gripping the first stop therebetween to interlock therewith during travel of the carriage and movable to an unlocked position, and means operated as an incident to the operation of the machine to commence a new line to unlock said stops.

3. In a typewriting machine, the combination with a frame, a travelling carriage, and a motor drive for the carriage, of a tabulating stop on the frame, a pair of travelling tabulating stops on the carriage to automatically grip the first-named stop therebetween to interlock therewith during travel of the carriage, and means operating coincidentally with the interlocking of said stops, to disengage the motor drive and carriage.

4. In a typewriting machine, the combination with a frame, and a travelling carriage adapted to define a plurality of continuous writing lines extending from left to right and spaced apart in the direction of travel of the carriage, of a shaft on the carriage, said carriage and shaft having relative movement in the direction of their travel, tabulating stops on the shaft and frame, respectively to automatically interlock during travel of the carriage, and means operating automatically as an incident to operation of the machine to begin a new line to unlock said stops.

5. In a typewriting machine, the combination with a frame, and a travelling carriage, of a shaft on the carriage, said shaft and carriage having relative movement in the direction of their travel, a tabulating stop on the frame, tabulating stops on the shaft having relative separative movement to interlock with the first named stop, and means operated by movement of the carriage to separate the relatively separative stops.

6. In a typewriting machine, the combination with a frame, and a travelling carriage adapted to define a plurality of writing lines extending from left to right and spaced apart in the direction of travel of the carriage, of a tabulating stop on the frame, tabulating stops on the carriage having relative separative movement to interlock with the first named stop, and movable to an unlocking position, means operated by movement of the carriage and separating the relatively separative stops, and means operating as an incident to the operation of the machine to commence a new line to disable said carriage tabulating stops.

7. In a typewriting machine, the combination with a frame, and a travelling carriage to define a plurality of continuous writing lines extending from left to right and spaced apart in the direction of travel of the carriage, of tabulating mechanism including frame and carriage tabulating stops, respectively, automatically interlocking during travel of the carriage, and permitting independent travel of the carriage, means for locating the carriage relative to the interlocked stops, means for locking the carriage in located position, and means operated as an incident to the operation of the machine to commence a new line to unlock said stops.

8. In a typewriting machine, the combination with a frame, and a travelling carriage, of a shaft on the carriage, said carriage and shaft having relative forward and reverse movement, tabulating stops on the frame, and shaft, respectively, automatically interlocking during travel of the shaft, cooperating means on the carriage and shaft, respectively for, arresting movement of the carriage relatively to the shaft, and including carriage locating stops, and centering and locking means, and means for automatically unlocking the interlocked stops and said locking means simultaneously.

9. In a typewriting machine, the combination with a line space carriage freely movable in a line spacing direction, and a motor drive therefor, including a drive-disconnecting control, of line tabulating mechanism, including cooperating tabulating stops interlocking to arrest free movement of the carriage, and carriage operated means for operating the drive-disengaging control coincidentally with the interlocking of said stops.

10. In a typewriting machine, the combination with a line space frame freely movable in a line spacing direction, and a printing head thereon movable in the direction of the line of writing, of line tabulating mechanism, including cooperating tabulating stops interlocking to arrest free movement of the carriage, and means operated by movement of said printing head to unlock said stops.

11. In a typewriting machine, the combination with a line space carriage freely movable in a line spacing direction, and a motor drive therefor, including a drive-disconnecting control, of line tabulating mechanism, including cooperating tabulating stops interlocking during such movement of the carriage and permitting limited independent movement of said carriage during interlocking, and means operated by such independent movement of the carriage to operate the drive-disconnecting control.

12. In a typewriting machine, the combination with a frame, and a carriage adapted to be advanced and retracted thereon, of tabulating mechanism, including a shaft on the carriage normally advanced and retracted therewith and permitting advance and retraction of the carriage relatively to the shaft, a single set of cooperating stops on the frame and shaft, respectively, automatically interlocking to arrest advance and retraction of said shaft, and cooperating stops on the shaft and carriage, respectively, automatically interlocking to arrest advance and retraction of the carriage relative to the shaft.

13. In a typewriting machine, the combination with a frame, and a carriage adapted to be advanced and retracted thereon, of tabulating mechanism, including a rock shaft on the carriage normally travelling therewith and permitting advance and retraction of the carriage relatively to the shaft, cooperating stops on the frame and shaft, respectively, automatically interlocking to arrest advance and retraction of the shaft, cooperating stops on the shaft and carriage, respectively, automatically interlocking to arrest advance and retraction of the carriage relatively to the shaft, the stops on the shaft being movable to ineffective position by rocking movement of the shaft, and means for rocking the shaft.

14. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft, respectively, for arresting advance of said shaft, and means rendered effective by advance of the carriage relatively to the shaft to lock the shaft to the frame stop and the carriage to the shaft against retraction, respectively.

15. In a typewriting machine, the combination with a frame, and a carriage adapted to be advanced and retracted thereon, of tabulating mechanism, including a shaft on the carriage normally advanced and retracted therewith, and permitting advance and retraction of the carriage relatively thereto, cooperating stops on the frame and shaft, respectively, for arresting advance of the shaft, and means for locking the shaft to the frame stop against retraction, and including a stop on said shaft movable along the same for cooperation with the frame stop, by advance of the carriage relatively to said shaft.

16. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft, respectively, for arresting advance of the shaft, and cooperating stops on the carriage and shaft, respectively, rendered effective by advance of the carriage relatively to the shaft to lock the shaft to said frame stop against retraction, and to subsequently lock the carriage to the shaft against advance and retraction relatively thereto.

17. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft for arresting advance of the shaft, means for locking the shaft to the frame stop against retraction, and including a stop on the shaft movable along the same for cooperation with the frame stop, by advance of the carriage relatively to the shaft, and cooperating stops on the carriage and shaft, respectively, rendered effective by such advance of the carriage to lock the latter to the shaft against retraction relatively thereto.

18. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft, respectively, for arresting advance of the shaft, means for locking the shaft to the frame stop against retraction, including a stop on the shaft movable along the same for cooperation with the frame stop, by advance of the carriage relatively to the shaft, and cooperating stops rendered effective by such advance of the carriage, to lock the latter to the shaft against retraction relatively thereto, including a fixed stop on the shaft, and a movable stop on the shaft advanced relatively to the latter by the carriage.

19. In a machine of the class described the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft, respectively, for arresting advance of the shaft, and cooperating stops rendered effective by advance of the carriage relatively to the shaft, to arrest retraction of the carriage relatively to the shaft, including a fixed stop on the shaft, and a movable stop on the shaft advanced relatively to the latter by the carriage.

20. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft adapted for interlocking during advance of the shaft, and cooperating stops rendered effective by advance of the carriage relatively to the shaft, to arrest retraction of the carriage relatively to the shaft, and including a fixed stop on the shaft, and a movable stop on the shaft advanced relatively to the same by the carriage, and tensioned to move in front of the fixed stop.

21. In a typewriting machine, the combination with a frame, and a carriage adapted to be advanced and retracted thereon, of tabulating mechanism, including a shaft on the carriage normally advanced and retracted therewith and permitting advance and retraction of the carriage relatively thereto, cooperating stops on the frame and shaft for arresting advance of said shaft, means for locking the shaft to the frame stop against retraction, including a movable stop on the shaft adapted for advance along the same by the carriage, and for cooperation with the frame stop, a resilient member between the carriage and shaft for cushioning advance of the former relatively to the latter, and a resilient member between the movable stop and shaft for cushioning advance of the movable stop and returning the same from advanced position.

22. In a typewriting machine, the combination with a frame, a carriage travelling thereon, and a printing head travelling on the carriage, of tabulating mechanism, including tabulating stops on the frame and carriage, respectively, automatically interlocking during travel of the carriage, and means operative by travel of the printing head to unlock said stops.

23. In a typewriting machine, the combination with a frame, a carriage travelling thereon, and a printing head travelling on the carriage in opposite directions, respectively, of tabulating mechanism, including tabulating stops on the frame and carriage, respectively, automatically interlocking during travel of the carriage, and means operative by travel of the printing head in either direction to unlock said stops.

24. In a typewriting machine, the combination with a frame, a carriage travelling thereon, and a printing head travelling on the carriage, of tabulating mechanism, including a rock shaft on the carriage, cooperating stops on the frame and shaft automatically interlocking during travel of the carriage, and adapted to be unlocked by rocking movement of the shaft, and means operative by travel of the printing head to rock said shaft.

25. In a typewriting machine, the combination with a frame, a carriage travelling thereon, and a printing head travelling on the carriage, of tabulating mechanism, including a pair of tabulating stops on the frame and carriage, respectively, adapted for contacting relation during travel of the carriage, and means operative by travel of the printing head to move one of said stops out of such contacting relation.

26. In a machine of the class described, the combination of a frame, a carriage adapted to be advanced and retracted on said frame to define writing lines, and tabulating mechanism to control said advancing and retracting movement, including a stop on said frame, a shaft carried by, and movable longitudinally and arcuately with respect to, said carriage, spring means tending to move said shaft longitudinally and arcuately, a stop fixed to said shaft, said spring means normally acting to rock said fixed stop into the path of said frame stop to arrest advancing movement of said shaft, a stop journaled on said shaft, a second spring means acting to rock said journaled stop into the path of said frame stop to arrest rebound movement of said carriage, means to locate said carriage with respect to the longitudinal axis of said shaft to define a writing line, said last mentioned means being automatically actuated by movement of said carriage relatively to said shaft against the action of said first mentioned spring after the shaft has been arrested by said stops, said locating means being operative to maintain said first mentioned spring in compressed condition to restrain movement of the carriage beyond the writing line, said second mentioned spring being adapted to augment the tendency of said first mentioned spring to prevent movement of the carriage beyond the writing line and to resist rebound movement of the carriage away from the writing line, and means actuated as an incident to commencing a new line, to simultaneously disable said locating means and said fixed and journal stops.

27. In a machine of the class described, the combination of a frame, a carriage adapted to be advanced and retracted on said frame, to define writing lines, and tabulating mechanism to control said advancing and retracting movement, including a stop on said frame, a shaft carried by, and movable longitudinally and arcuately with respect to, said carriage, spring means tending to move said shaft longitudinally and arcuately, a stop fixed to said shaft, said spring means normally acting to rock said fixed stop into the path of said frame stop to arrest advancing movement of said shaft, a stop journaled on said shaft, a second spring means acting to rock said journaled stop into the path of said frame stop to arrest rebound movement of said carriage, means to cause said journaled stop to move with said fixed stop when the fixed stop is rocked out of frame stop-engaging position, means to locate said carriage with respect to the longitudinal axis of said shaft to define a writing line, said last mentioned means being automatically actuated as an incident to the tendency of said carriage to advance under the influence of its momentum after said shaft has been arrested through the coaction of said frame and fixed stops, said locating means operating to utilize the compressive resistance of said first mentioned spring to restrain movement of the carriage beyond the writing line, said second mentioned spring being adapted to augment the tendency of said first mentioned spring to prevent movement of the carriage beyond the writing line and to resist rebound movement of the carriage away from the writing line, and means to simultaneously disable said locating means and said fixed and journaled stops.

28. In a typewriting machine, the combination with a frame, and a line space carriage movable thereon to define successive writing line positions spaced normally of the direction of writing; of normally inoperative, manually conditioned tabulating stops on said frame individually associated with particular ones of the writing line positions of said carriage, a normally operative stop on the carriage adapted to co-act with a conditioned stop on said frame to arrest movement of the carriage, and means actuated automatically as an incident to operation of the machine to commence a new writing line, to disable said carriage stop.

29. In a typewriting machine, the combination with a frame, and a line space carriage movable thereon to define successive writing line positions spaced normally of the direction of writing; of normally inoperative, manually conditioned tabulating stops on said frame individually associated with particular ones of the writing line positions of said carriage, a normally operative stop on the carriage adapted to co-act with a conditioned stop on said frame to arrest advancing movement of the carriage, means actuated as an incident to arresting said carriage, to locate it in the line position predetermined by said frame stop, and means actuated as an incident to operation of the machine to commence a new writing line, to disable said carriage stop and said line locating means.

30. In a typewriting machine, the combination with a frame, and a line space carriage movable thereon to define successive writing line positions spaced normally of the direction of writing; of normally inoperative, manually conditioned tabulating stops on said frame individually associated with particular ones of the writing line positions of said carriage, a normally operative stop on the carriage adapted to co-act with a conditioned stop on said frame to arrest advancing movement of the carriage, a second normally operative stop on the carriage to arrest rebound movement of the latter, means actuated as an incident to arresting advancing movement of the carriage, to effect its location in the line position predetermined by said frame stop, and means actuated automatically as an incident to operation of the machine to commence a new writing line, to disable said carriage stops and said line locating means.

31. In a writing machine, the combination with a frame; a carriage to travel on the frame; a motor drive to advance and retract the carriage relatively to the frame; and means to connect and disconnect the motor and carriage; of tabulating stops on the frame and carriage, respectively, adapted to contact during the travel of the carriage in one direction; and means to automatically effect the disconnection of the motor drive and carriage upon the contact of the stops.

32. In a writing machine, the combination with a frame; a carriage to travel on the frame; a motor drive to advance and retract the carriage relatively to the frame; and means to connect and disconnect the motor and carriage; of settable tabulating stops on the frame; main and rebound-preventing stops on the carriage, adapted to automatically embrace a settable frame stop during travel of the carriage in one direction, the carriage and its stops adapted for limited relative movement, means to cushion the carriage; and means to automatically effect the disconnection of the motor drive and carriage upon the engagement of the carriage stops with a selected frame stop.

33. In a writing machine, the combination with a frame; and a carriage arranged to travel on the frame; of tabulating mechanism for the carriage, including a tabulating shaft mounted in the carriage to provide for mutual relative movement between the carriage and the shaft; a stop fixed on the shaft; a frame stop with which the first-named stop co-acts to arrest the shaft, and enable the carriage to continue its advance independently of, and relatively to, the shaft; a cushioning element interposed between the shaft and carriage, and adapted for compression by the independent advance of the carriage; and a spacing member freed for operation by the relative advance of the carriage, to shift into effective position between the shaft and the carriage, as the carriage approaches its forward limit of independent travel.

34. In a writing machine, the combination with a frame; and a carriage arranged to travel thereon; of means to tabulate the carriage on its travel in one direction, including a tabulating shaft mounted in the carriage to provide for mutual relative movement; co-acting stops on the carriage and frame, respectively, one of which stops is settable to effective and ineffective positions; a cushioning element between the carriage and the tabulating shaft; and an interponent adapted for introduction between the carriage and the shaft when the carriage approaches its forward limit of independent movement relatively to the shaft, to eliminate the play between the carriage and the shaft, and prevent relative movement therebetween.

35. In a writing machine, the combination with a frame; and a travelling carriage supported thereon; of tabulating mechanism, including a settable tabulating stop; carriage stops adapted to grip opposite sides of the settable stop; one of the carriage stops adapted for movement towards and from the remaining carriage stop; means to limit the retracting movement of the movable carriage stop; the carriage adapted for limited movement in the direction of its travel, independently of the stops; a cushioning element between the carriage and the carriage stops; and means interposable between the carriage stops and carriage as the latter approaches the forward end of its independent movement, to eliminate the clearance provided between the carriage and the carriage stops.

HARRY A. FOOTHORAP.